United States Patent [19]

Rice et al.

[11] 3,838,261

[45] Sept. 24, 1974

[54] INTERRUPT CONTROL CIRCUIT FOR CENTRAL PROCESSOR OF DIGITAL COMMUNICATION SYSTEM

[75] Inventors: Verner K. Rice, Wheaton; John J. Mele, Chicago; Rolfe E. Buhrke, La Grange Park, all of Ill.

[73] Assignee: GTE Automatic Electric Laboratories Incorporated, Northlake, Ill.

[22] Filed: Sept. 14, 1973

[21] Appl. No.: 397,458

[52] U.S. Cl. 235/153 AE, 179/18 ES, 179/175.2 C, 235/153 AC, 235/153 AK, 340/172.5

[51] Int. Cl. ... H04m 3/24, H04m 3/10, G06f 15/16

[58] Field of Search........... 340/172.5; 179/175.2 C, 179/18 ES; 235/153 AC, 153 AE, 153 AK

[56] References Cited

OTHER PUBLICATIONS

Harr, J. A. et al., Orginazation of No. 1 ESS Central Processor, in Bell Sys. Tech. J. 43(5) Part 1: September 1964, pp. 1884–1889, TKI.B435.

Downing, R. W., No. 1 ESS Maintenance Plan, in Bell Sys. Tech. J. 43(5) Part 1: pp. 1961–2019, September 1964, TKI.B435.

*Primary Examiner*—Malcolm A. Morrison
*Assistant Examiner*—R. Stephen Dildine, Jr.

[57] ABSTRACT

The control and maintenance complex of a TSPS telephone system is provided with duplicate copies of a programmable central data processor, instruction storage, process storage and peripheral units which interface with the telephone network. When a fault is detected, the system enters a recovery phase to try to obtain a fault-free combination. Recovery programs have priority over call processing programs. An interrupt control circuit (ICC) is present in each central processor; and the ICC in the active central processor, upon fault detection by the central processor, controls the execution of maintenance interrupts. The ICC establishes priority of recovery programs, inhibits the call for recovery programs of lesser priority than the one being executed, and generates an Interrupt Control Circuit Sequence Level signal which performs many functions in the other circuits of the central processor, including those necessary to call and run a recovery program without losing data when the interrupt occurs.

8 Claims, 18 Drawing Figures

PATENTED SEP 24 1974

3,838,261

SHEET 02 OF 11

CENTRAL PROCESSOR FUNCTIONAL INTERFACE BLOCK DIAGRAM

FIG.8
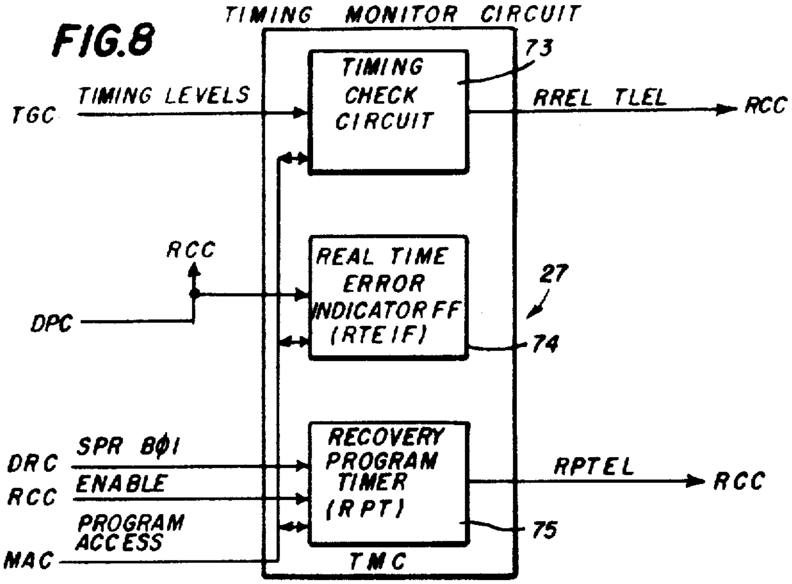
FIG.9
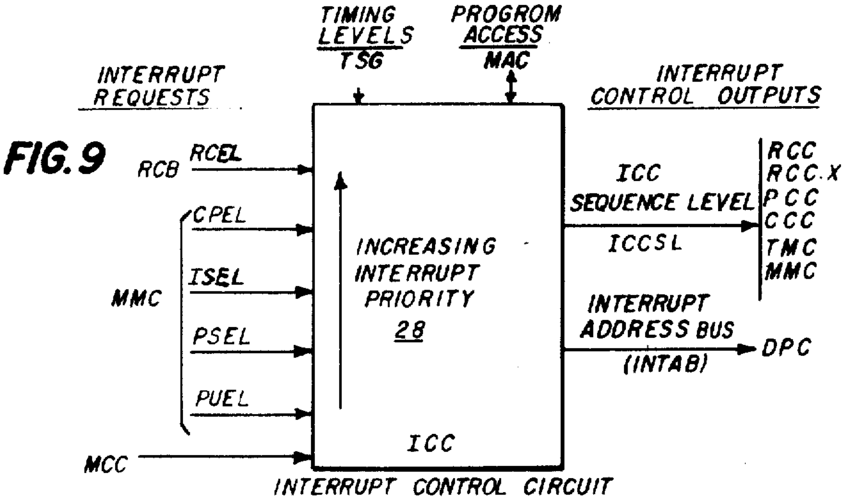
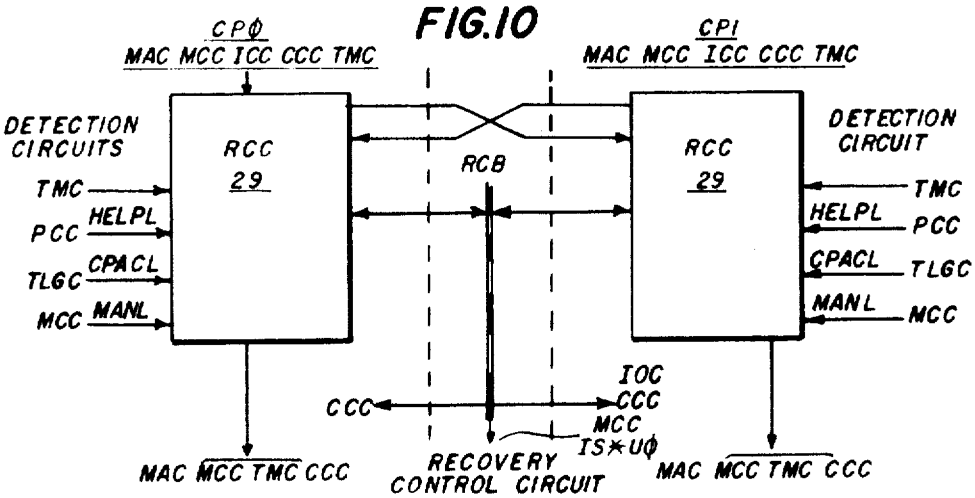

CONFIGURATION CONTROL CIRCUIT

MAINTENANCE ACCESS CIRCUIT

INTERRUPT AND INHIBIT FLOP FLOP SECTION

INPUTS AND OUTPUTS OF THE ICC

PRIORITY 1 INTERRUPT

PRIORITY 1 INTERRUPTS

TIMING CHART

SENSE AND CONTROL GROUP FORMATS

INTERRUPT CONTROL CIRCUIT FOR CENTRAL PROCESSOR OF DIGITAL COMMUNICATION SYSTEM

BACKGROUND AND SUMMARY

The present invention relates to communication system, and more particularly, it relates to communication systems which employ digital control systems including central data processors. In systems of this type, there are duplicate copies of the central data processor, as well as duplicate copies of instruction storage, process storage, and peripheral units for increased reliability. In other words, upon detection of a fault in one copy of a given subsystem, the central processor is forced into a recovery stage in which it seeks to restore system operation by including one operable copy of each subsystem.

Normally, the data processor executes call processing programs, and periodically, it conducts maintenance tests. When a malfunction is uncovered, the system of the present invention seeks to isolate the source of the fault in one of the following units, if possible: Central Processor, Instruction Storage, Process Storage, or Peripheral Unit. If such isolation is possible, a corresponding recovery program is executed. If such isolation is not possible, a system recovery program is executed.

The system recovery program is of higher order than the other recovery programs mentioned, and the recovery programs have a higher order priority than the call processing and maintenance programs since it is desired to do all call processing program execution with a system that is known to be operational. Hence, it is necessary to interrupt the program being executed, whether maintenance, diagnostic or call processing, when a fault is detected.

One such data processor is disclosed in copending, co-owned application of Brenski, et al., entitled "Control Complex for TSPS Telephone System", Ser. No. 289,718, filed Sept. 15, 1972. The subject matter of said application is incorporated herein by reference. Further, the subject matters of the following applications relate to and further describe the Central Processor, Instruction Store, Process Store, and Peripheral Unit; and they further relate to the instant invention and are incorporated herein by reference:

1. Chang, et al., "Timing Monitor Circuit for Central Data Processor of Digital Communications System", U.S. Pat. No. 3,810,121;
2. Schulte, et al., "Maintenance Access Circuit for Central Processor of Digital Communication System", U.S. Pat. No. 3,806,887
3. Wilber, et al., "System for Reconfiguring Central Processor and Instruction Storage Combinations", Ser. No. 341,428, filed Mar. 15, 1973;
4. Buhrke, et al., "Timing Monitor Circuit for Central Data Processor of Digital Communication System", Ser. No. 393,543, filed Aug. 31, 1973;
5. Schulte, et al., "Program Timing Circuitry for Central Data Processor of Digital Communication System", Ser. No. 393,542, filed Aug. 31, 1973;
6. Mele, et al., "Configuration Control Circuit for Control and Maintenance Complex of Digital Communication System", Ser. No. 397,452, filed Sept. 14, 1973; and
7. Wilber, et al., "Malfunction Monitor Circuit for Central Data Processor of Digital Communication System", Ser. No. 397,567, filed Sept. 14, 1973.

In brief, the present invention concerns an interrupt control circuit (ICC) of the Central Processor (CP) which controls the execution of maintenance interrupts. A maintenance interrupt is a one-cycle wired transfer instruction which causes the control and maintenance complex to begin execution of a recovery program. The malfunction detection circuits in the malfunction monitor circuit of the CP initiate maintenance interrupts whose execution takes precedence over the execution of any other central processor instructions or programs.

The ICC provides five maintenance interrupts:

1. System Recovery,
2. Central Processor Recovery,
3. Instruction Store Recovery,
4. Process Store Recovery, and
5. Peripheral Unit Recovery.

When an interrupt occurs, the ICC produces a signal called ICC Interrupt Sequence Level (ICCSL) which controls the execution of the interrupt in other CP circuits. The address for the recovery program called for by the interrupt is placed on a special bus called the INTerrupt Address Bus (INTAB) to the Data Processing Circuit, from which it is sent as the address of the next instruction to be executed. That is, it is a transfer instruction which calls the first instruction of the recovery program about to be run.

The Interrupt Control Circuit includes interrupt flip-flops, one associated with each of the recovery programs, togather with inhibit flip-flops, one associated with each priority level for a recovery program. The circuitry also includes a priority circuit which establishes the proper priority for the recovery programs, actuates the inhibit circuitry which, in turn, controls the interrupt flip-flop, so that an interrupt of lower order priority, if it occurs, will not take effect if a higher order priority recovery program is being run. On the other hand, if a higher order priority interrupt does occur, the program being run, even if it is a recovery program, will be interrupted and the higher order priority recovery program will be executed.

The highest order of priority for a recovery program is assigned to a system recovery program, and it may be executed either by a maintenance man, the recovery control circuit in the Central Processor, or under program control, as will be discussed.

THE DRAWING

FIG. 8 is a functional block diagram of the Timing Monitor Circuit of the Central Processor;

FIG. 9 is a functional block diagram of the Interrupt Control Circuit of the Central Processor;

FIG. 10 is a functional block diagram of the Recovery Control Circuit of the Central Processor;

DETAILED DESCRIPTION

I. Introduction--TSPS

Figure 1:
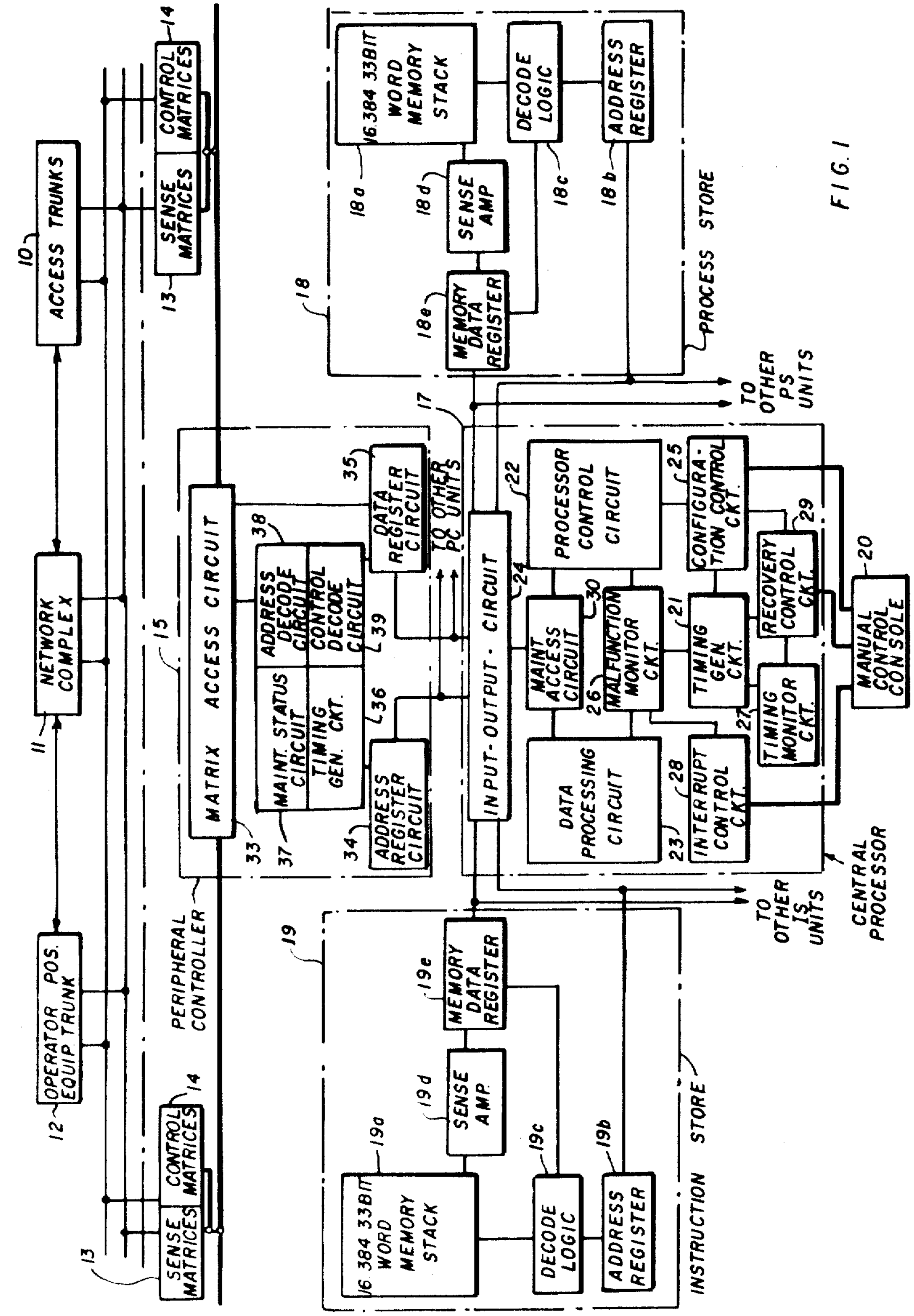
FIG. 1 is a functional block diagram of a TSPS system including a Control and Maintenance Complex.

The primary function of the TSPS System is to provide data processor control of the various functions in tool calls which in the past have been performed by operators but have not required the exercise of discretion on the part of the operator. At the same time, the system must permit operator intervention, as required. Thus, various trunks from an end office to a toll center pass through the TSPS System, and these are commonly referred to as Access Trunks, functionally illustrated in FIG. 1 by the block 10.

The access trunks 10 are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the throughput access trunks, including remote operator positions, equipment trunks, magnetic tape equipment for recording charges, and various other equipment diagrammatically illustrated by the block 12. Additional details regarding the network complex 11 and the auxiliary equipment and communication lines 12 for a TSPS System may be obtained from the *Bell System Technical Journal* of December, 1970, Vol 49, No. 10.

The present invention is more particularly directed to one aspect of the data processor which controls the telephony—namely the maintenance circuitry in the Central Processor (CP) which controls the systems and performs call processing as well as maintenance and recovery functions The Central Processor is shown in simplex form within the chain block 17 of FIG. 1.

It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the Central Processor, including internal and external maintenance, table look-ups, computations, monitoring of different access trunks, system recovery from a detected fault, etc. between the expected changes in a given trunk.

The TSPS System uses a storage program control as a means of attaining flexibility for varied operating conditions. Reliability is attained by duplicating hardware wherever possible. A stored program control system consists of memories for instructions and data and a processing unit which performs operations, dictated by the stored instructions, to monitor and control peripheral equipment.

A Control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable.

The interface between the telephony equipment and the data processor is the Peripheral Unit Complex which includes a number of sense matrices 13 and control matrices 14 together with a Peripheral Controller diagrammatically indicated by the chain block 15.

The principal elements of the data processing circuitry include the Central Processor (CP) 17, a Process Store (PS) enclosed within the chain block 18, and an Instruction Store (IS) enclosed within the chain block 19. A computer operator or maintenance man may gain manual access into the Central Processor 17 by means of a manual control console 20, if desired or necessary.

The Instruction Store (IS) 19 which consists of two copies, contains the stored programs. Each copy has up to eight units as shown in block 19 and includes two types of memory:

1. A read-only unit 19*a* containing a maximum of 16,384 thirty-three bit words.
2. Core Memory in remaining units containing a maximum of seven units of 16,384 thirtythree bit words per unit. Individual words are read from or written into IS by CP 17, as will be more fully described below.

Each IS unit 19 of the eight possible is similar; and they are of conventional design including an Address Register 19b receiving digital signals representative of a particular word desired to be accessed (for reading or writing as the case may be). This data is decoded in the Decode Logic Circuit 19*c;* and the recovered data is sensed by sense amplifiers 19*d* and buffered in a Memory Data Register 19*e* which also communicates with the Central Processor 17.

The Process Store (PS) 18 contains call processing data generated by the program. The PS (also in duplicate copies) comprises Core Memory units 18a containing a maximum of eight units of 16,384 thirty-three bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic Circuit 18*c*. The recovered information is sensed by sense amplifiers 18*d* and buffered in Memory Data Register 18e.

The CMC communicates with the telephony and switching equipment through matrices 13, 14 of sense and control devices. Any number of known design elements will work insofar as the instant invention is concerned. The sense and control matrices 13, 14 are each organized into 32 bit sense words and 32 bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program, from IS. The CP reads and executes most instructions in 4 microseconds (one machine cycle time). Those instructions that access IS require 8 microseconds require two machine cycles to be executed and are referred to as "dual cycle" instructions.

The instructions obtained from the IS can be considered "Directives" to the CP specifying that it is to perform one of the following operations:

a. Change and/or transfer information inside the CP in accordance with some fixed rule.
b. Communicate with the IS or PS by requesting the IS/PS to either;
   1. Read a 33 bit word from a specified location, or
   2. Write a 33 bit word into a specified location.
c. Communicate with the PC by requesting PC to either;
   1. Read a specified 32 bit from sense point word, or
   2. Write into a specified 32 bit control point word.
d. Perform maintenance operations internal to CP by either;
   1. Reading from a maintenance sense group, or
   2. Writing into a maintenance control group.

Figure 2:
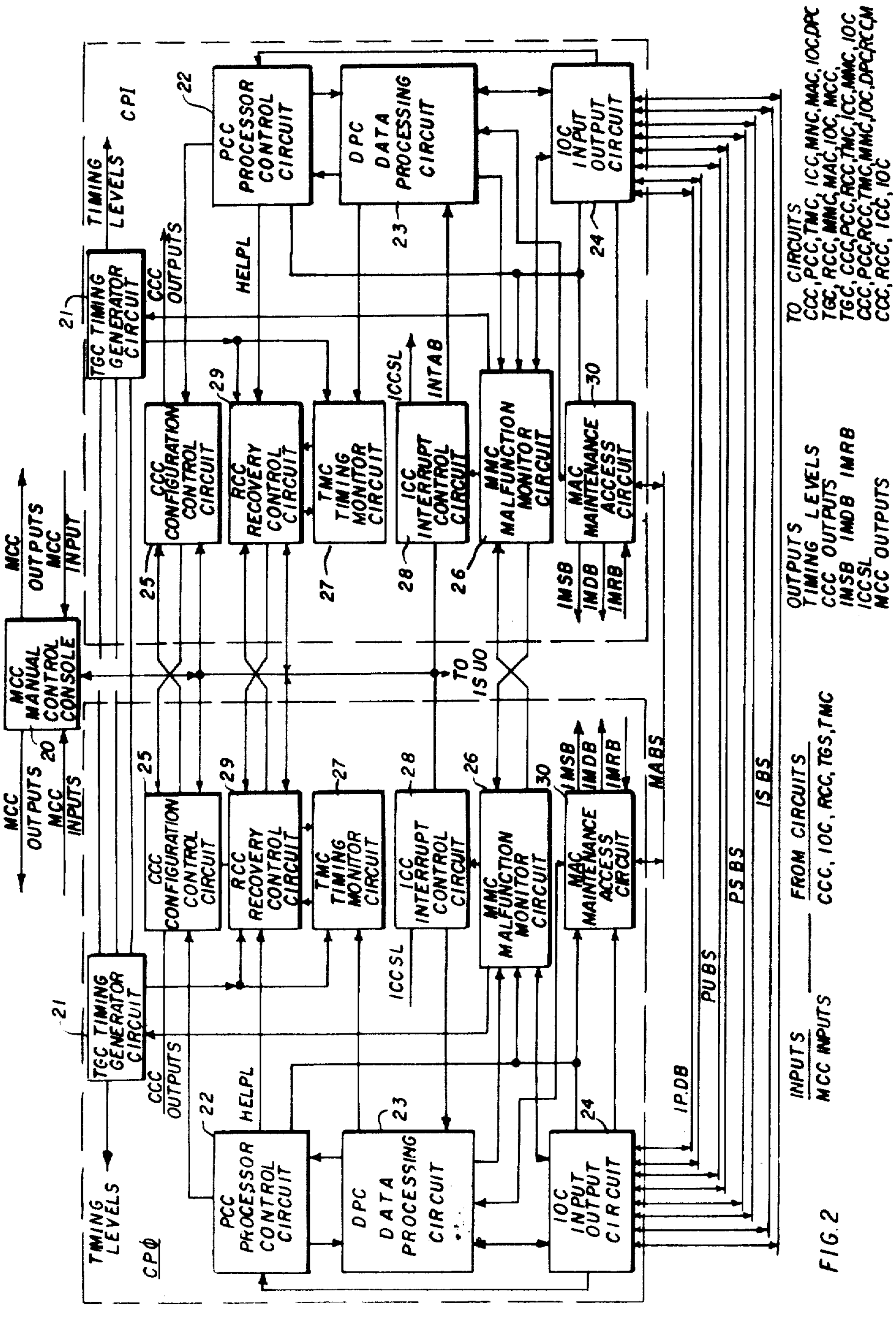
FIG. 2 is a functional block diagram showing redundant copies of the Central Processor and their associated busing systems.

The Control and Maintenance Complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.
2. Matching between copies provides the primary means of detecting failures.
3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined:

1. One Central Processor must always be in the active state, only the active CP can change the configuration of the CMC,
2. If the other CP is in-service, that CP is the standby CP, and
3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points. Further, the duplicate copies of IS are designated active and standby according to which one (called the "active" one) is associated with the primary CP.

II. The Central Processor—An Overview

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into ten circuits. The first four provide the processing function.

1. Timing Generator Circuit (TGC), designated 21,
2. Processor Control Circuit (PCC), 22,
3. Data Processing Circuit (DPC), 23, and
4. Input/Output Circuit (IOC), 24.

The above four processing circuits are described herein only to the extent necessary to understand the present invention. Additional details may be found in the copending, co-owned application of Brenski, et al., entitled "Control Complex for TSPS Telephone System", filed Sept. 15, 1972, and assigned Ser. No. 289,718. The subject matter of this application is incorporated herein by reference.

The remaining circuits in the CP provide the maintenance function and these include:

5. Configuration Control Circuit (CCC) 25,
6. Malfunction Monitor Circuit (MMC) 26,
7. Timing Monitor Circuit (TMC) 27,
8. Interrupt Control Circuit (ICC) 28,
9. Recovery Control Circuit (RCC) 29, and
10. Maintenance Access Circuit (MAC) 30.

In FIG. 2, there is shown duplicate copies of each of the above circuits in the Central Processor, with like circuits having identical reference numerals.

Turning back to FIG. 1, a pair of Peripheral Controllers is associated with each Peripheral Control Unit (PCU). Each Peripheral Controller 15 includes the following circuits which are also described in more detail in the above-referenced Brenski, et al. application Ser. No. 289,718:

1. A Matrix Access Circuit 33,
2. An Address Register Circuit 34,
3. A Data Register Circuit 35,
4. A Timing Generator Circuit 36,
5. A Maintenance Status Circuit 37,
6. An Address Decode Circuit 38, and
7. A Control Decode Circuit 39.

Figure 2A:
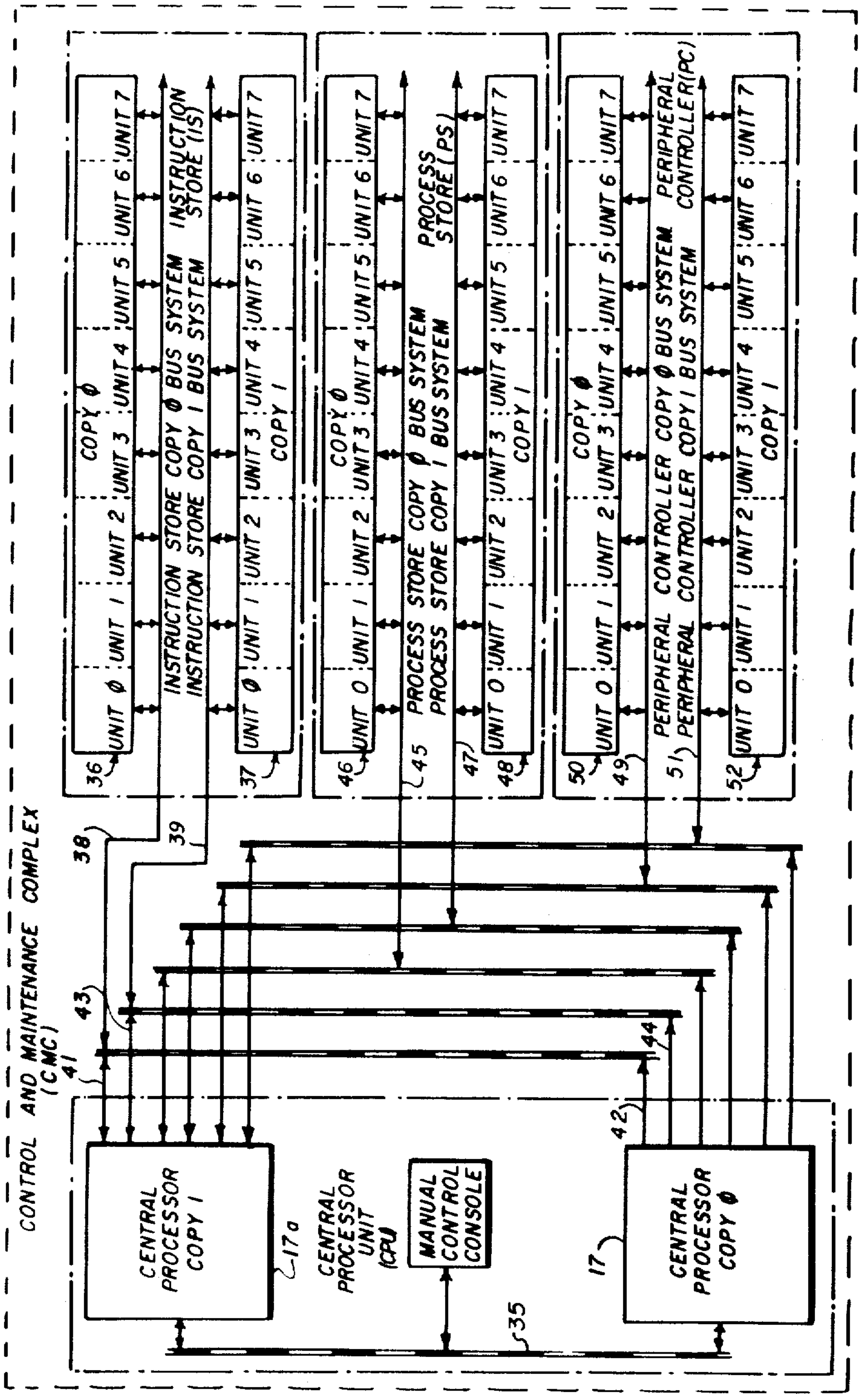
FIG. 2A is a functional block diagram showing communication between both copies of the Central Processor and duplicate copies of the Instruction Store, Process Store and Peripheral Controller.

The functional interface between the Central Processor, and other system equipment, is shown in functional block diagram form in FIG. 2A. As can be seen, there is intercommunication between both copies of the Central Processor designated 17 and 17*a* respectively and the manual control console. Maintenance personnel can monitor the status and manually reconfigure the control and maintenance complex from this console.

As can also be seen in FIG. 2A, both Central Processor copies have direct, two-way communication links between each other, via internal bus 35, and with both copies of Instruction Store, designated 36 and 37 respectively, via their associated bus systems 38 and 39. Similar communication is provided with the Process Store, and the Peripheral Controllers. This interface is provided by six separate bus systems.

I. An Instruction Store copy 0 bus system (IS0.BS) is designated 38. This interfaces both copies 17*a*, 17 of the Central Processor via buses 41, 42 with each of the 8 units (IS0.U0 through IS0.U7) that form Instruction Store copy 0 (IS0) generally designated 36.

II. An Instruction Store copy 1 bus system (ISI.BS) is designated 39. This interfaces both copies of the Central Processor via buses 43, 44 with each of the 8 units (IS1.U0) through IS1.U7) that form Instruction Store copy 1 (ISI), generally designated 37.

III. A Process Store copy 0 bus system (PS0.BS) is designated 45; and it interfaces both copies of the Central Processor with each of the 8 units (PS0.U0 through PS0.U7) that make up Process Store copy 0 (PS0), generally designated 46.

IV. A Process Store copy 1 bus system (PS1.BS) is designated 47; and it interfaces both copies of the Central Processor with each of the 8 units (PS1,U0 through PS1.U7) that make up Process Store copy 1 (PS1), generally designated 48.

V. A Peripheral Controller copy 0 bus system (PC0.BS) is designated 49; and it interfaces both copies of the Central Processor with each of the 8 Peripheral Controllers (PC0,U0 through PC0.U7) in Peripheral Control copy 0 (PC0), generally designated 50.

VI. A Peripheral Controller copy 1 bus system (PC1.BS) is designated 51; and it interfaces both copies of the Central Processor with each of the 8 Peripheral Controllers (PC1.U0 through PC1.U7) in Peripheral Control copy 1 (PC1), generally designated 52.

Each copy of the Peripheral Control bus system contains an address bus (PC0.AB and PC1.AB), a return bus (PC0.RB and PC1.RB), and a data bus (PC0.DB and PC1.DB). Each copy of the process store bus system contains an address bus (PS0.AB and PS1.AB) and a return bus (PS0.RB and PS1.RB). Each copy of the Instruction Store bus system contains an address bus (IS0.AB and IS1.AB, and a return bus (IS0.RB and IS1.RB). Each copy 0 of the Instruction Store bus system and the Process Store bus system share the same data bus: Instruction Store and Process Store copy 0 data bus (IP0.DB). Each copy 1 of the Instruction Store bus system and the Process Store bus system also share the same data bus: Instruction Store and Process Store copy 1 data bus (IPI.DB).

This data bus sharing by Instruction Store and Process Store affects the sequence of instructions that are to be executed by the Central Processor. An instruction directing the Central Processor to access (read from or write into) Process Store requires only one machine cycle, while an instruction directing the Central Processor to access Instruction Store requires two machine cycles. This means that the Central Processor can execute Process Store instructions in sequence, one after the other, for as long as needed, and it can also execute an Instruction Store instruction immediately following a Process Store instruction. However, it cannot execute two Instruction Store instructions, in sequence, nor can it execute a Process Store instruction immediately after an Instruction Store instruction, because of the shared data bus. The Central Processor will have been in the execution of an Instruction Store instruction only one machine cycle of the two required, when it starts executing the next instruction in sequence, and these two instructions cannot use the same data bus (IP0.DB or IPI,DB) simultaneously.

It is believed that a better understanding of the present invention will be obtained if there is an understanding of the overall function of each circuit in the CP, realizing the there are duplicate copies of the CP.

II. A. Processing Circuits of Central Processor Timing Generator Circuit (TGC)

Figure 3:
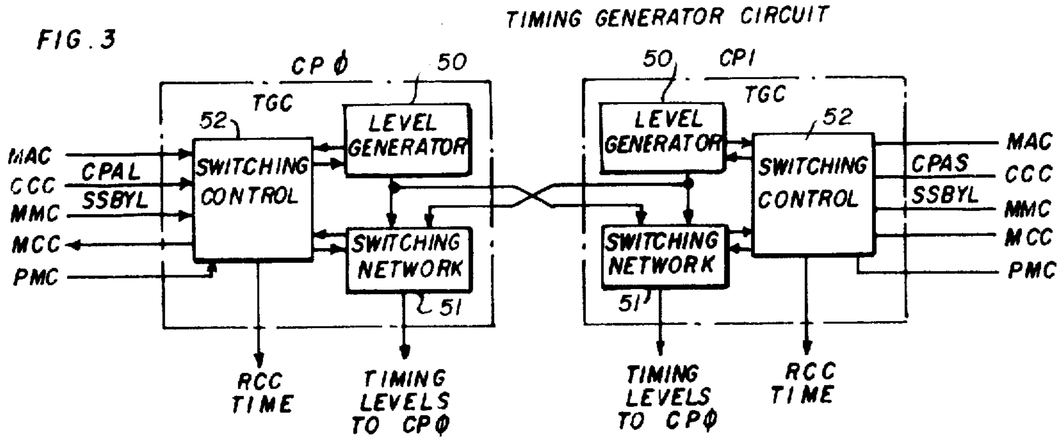
FIG. 3 is a functional block diagram of the Timing Generator Circuit of the Central Processor.

The Timing Generator Circuit 21 of FIGS. 1 and 2 (TGC) creates the timing intervals for the Central Processor. A more detailed functional block diagram for the TGCs of both Central Processors is shown in FIG. 3.

The TGC includes a level generator circuit 50 and creates eight timing intervals (or "levels" as they are referred to) every 4 $\mu$seconds. Each pulse is picked off a delay line. For each timing interval, TGC produces a 500 nano second (ns) timing interval place level (PL) and a 400 ns. timing interval accept level (AL). Each sequence of 8 timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's, Timing levels generated in the active CP control both CP's. A switching network 51 actuated by a switching control circuit 52 in each TGC transmits (if it is in the active CP) or receives the timing levels from the active TGC, and supplies them to the CP circuits. The standby CP may be stopped by directing the TGS in the standby CP to inhibit reception of timing levels. The TGS also notifies the Recovery Control Circuit 29 (RCC) and Timing Monitor Circuit 27 (TMC) for maintenance purposes whenever the CP's active/standby status changes.

Processor Control Circuit (PCC)

Figure 4:
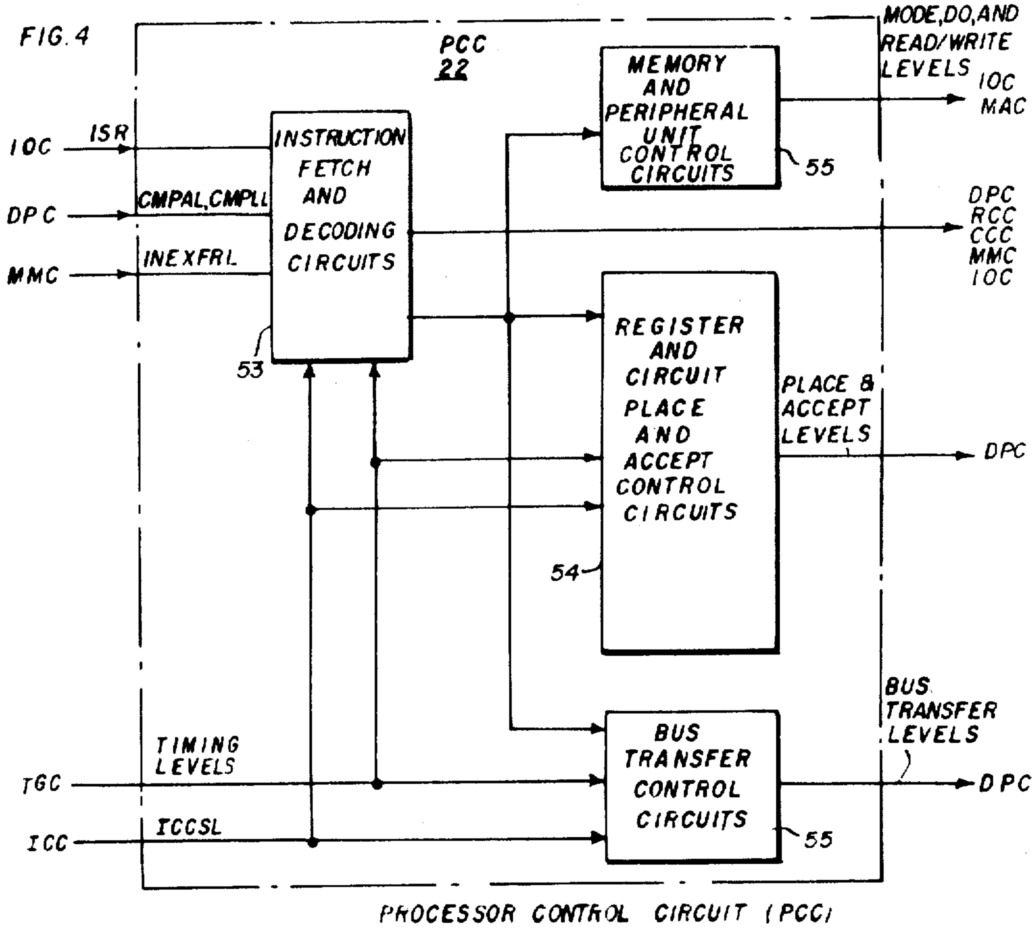
FIG. 4 is a functional block diagram of the Processor Control Circuit of the Central Processor.

The PCC 22 (see FIG. 4 for a more detailed functional block diagram) includes instruction fetch and decode circuits 53 which decode each instruction and generate the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command (generated in block 54) which places a DPC register or circuit on the Interval Output Bus of the PCC.
2. A Bus Transfer Command (generated in bus transfer control circuits 55) which transfers the information on the Internal Output Bus to the Internal Input Bus, and
3. A Register Accept Command (also generated in block 54) which gates the information on the Internal Input Bus to a DPC register.

The PCC also provides auxiliary commands to the DPC such as the selection of the function to be provided by the Logic Comparator Circuit (LCC).

Memory and peripheral unit control circuits 55 of the PCC provide the control signals to the IOC including the mode bits to be transmitted to these complexes.

The instruction fetch logic of block 53 controls an Instruction Address Register IAR, Add One Register AOR, and the instruction store read for the next instruction. The next instruction is read from the Instruction Store simultaneously with the execution of its predecessor.

The PCC also decodes the HELP instruction which is an input to the RCC that initiates a system recovery program interrupt. The instructions RMSG, WMSG, and WMCP ae decoded by the PCC but are executed by the Maintenance Access Circuit 30 (MAC). The Malfunction Monitor Circuit 26 (MMC) requires decoded instructions levels from the PCC in order to sample malfunction detection circuits.

Data Processing Circuit (DPC)

The DPC 23 (see also FIG. 5) contains the registers of the CP and the circuits required to perform arithmetic, logical, decision, and data transfer operations on the information in these registers. The General Registers (GR1, ..., GR7), in the Storage Section 56, the Special Purpose Register (SPR), also in Storage Section 56, and the Instruction Address Register (IAR) in the Address Section 57 are the program accessible registers. These registers and the operations which are performed on these registers by individual instructions are described more fully in the above-referenced application.

The remaining registers [Data Register (DR) and Arithmetic Register (AR) in Data Section 58, the Selection Register (SR), and Add One Register (AOR)] and circuits (Logic Comparator Circuit (LCC), Add Circuit (ADC) the Add One Circuit (AOC), and the Bus Transfer Circuit 59 (BTC) provide the data facilities required to implement the instruction operations on the program accessible registers.

A 32 bit Internal Input Bus (IIB) 60 is the information source for all DPC registers. In general, the DPC registers and circuits as well as other CP circuits place information on the 32 bit Internal Output Bus (IOB) 61. The Bus Transfer Circuit (BTC) 59 transmits information from the IOB 61 to the IIB 60. The information can be transferred in six ways which include complementing or not complementing the information, exchanging 16 bit halves (with or without complementing), or shifting the information left or right one bit.

A logic and compare circuit (LCC) provides a 32 bit logical AND, NOR, or EQUIVALENCE of the AR and DR and also matches the AR and DR. The ADD Circuit (ADC) provides the sum of the left half of the AR and the right half of the AR. The ADC is used for addition and subtraction and to generate PS and PU addresses. The 17 bit Instruction Address Register (IAR) is used to address the Instruction Store. The Add-One-Circuit (AOC) increments the right most 16 bits of the IAR by one. The AOC is used to compute the next instruction address (one plus the current address) which will be used if a Program Transfer does not occur.

Input Output Circuit (IOC)

Figure 6:
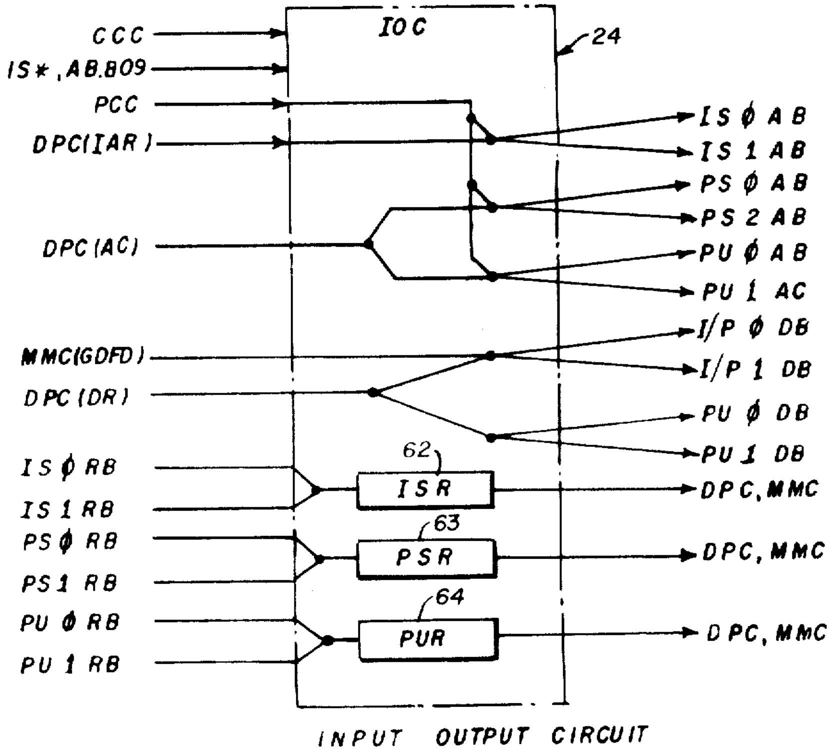
FIG. 6 is a functional block diagram of the Input/Output Circuit of the Central Processor.

The primary function of the IOC 24 (see also FIG. 6) is to provide the interface through which the Central Processor complex (CP*) gains access to the non-CP complexes (IS*, PS*, and PC*) via the external bus system. As seen diagrammatically in FIG. 6, the IOC sends data and addresses from the CP to the non-CP complexes and also receives and buffers data transmitted to the CP from non-CP complexes. The external bus system, used to transmit information between CP* and the non-CP complexes, comprises the Instruction Store Address Bus (IS*.AB), Process Store Address Bus (PS*.AB), Peripheral Control Address Bus (PC*.AB), Instruction Store-Process Store Data Bus (IP*.DB), Peripheral Control Data Bus (PC*DB), Instruction Store Return Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy 0, copy 1, or both copies of a particular bus. The choice of bus copies is determined by the Configuration Control Circuit 25.

There are three buffer registers in the IOC: the Instruction Store Register (ISR) designated 62, the Process Store Register (PSR) 63, and the Peripheral Unit Register 64. These registers communicate with both copies of the Return Buses from IS, PS and PU respectively; and they send received data to the DPC 23 and MMC 26, as shown.

II. B. Maintenance Circuits

The functions performed by the CP maintenance circuits include the following:

1. System configuration control (CCC 25),
2. Malfunction detection (MMC 26, TMC 27, DPC 23), 3. Recovery program initiation (ICC 28),
4. Recovery program monitoring (RCC 29, TMC 27),
5. Maintenance program access to CP circuits (MAC 30, MMC 26), and
6. Manual system control (MCC 20).

The CMC detects malfunctions as follows:

1. By matching, between CP copies, all data transfers in the CP Data Processing Circuit (MMC),
2. By parity checking of all memory read operations (MMC),
3. By monitoring internal checks by the IS*, PS*, and PC* (all-seems-well checks),
4. Address echo matching of addresses sent to IS*, PS*, and PC* with the echo address returned by the complex (DPC),
5. Timing level generation checking (TMC), and
6. Excess program time checking (DPC).

When a malfunction is detected by MMC 26, the Interrupt Control Circuit (ICC) 28 may initiate a maintenance interrupt to a recovery program. The recovery program attempts to locate the faulty unit, remove it from service, and reconfigure the complexes to a working system. The execution of the recovery programs are monitored by the TMC 27 and the RCC 29. The system recovery program is initiated (reinitiated) by the TMC 27 and the RCC 29 when higher level recovery is required. The Timing Monitor Circuit monitors recovery programs through the Recovery Program Timer (RPT) in the TMC 27 (see FIG. 8). If a recovery program fails to remain in synchronism with this timer, the TMC initiates (or re-initiates) the system recovery program through the Recovery Control Circuit. The execution of a HELP instruction may also initiate (re-initiate) the system recovery program directly through the RCC.

Malfunction Monitor Circuit (MMC)

Figure 7:
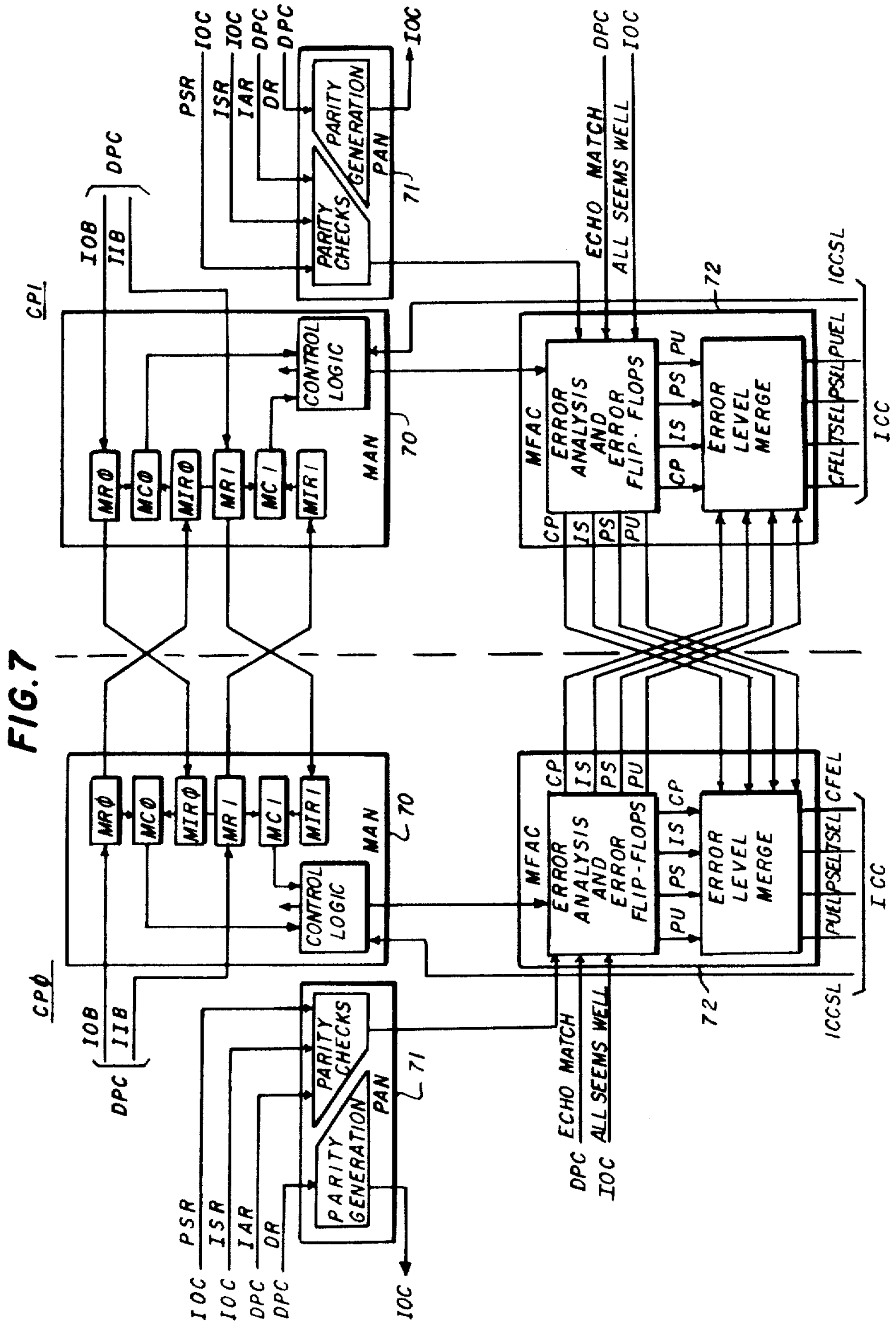
FIG. 7 is a functional block diagram of the Malfunction Monitor Circuit of the Central Processor.

The MMC 26 (seen in more detail in FIG. 7) provides the following maintenance functions:

1. Detection of malfunctions during the execution of programs,
2. Classification of malfunctions into CP*, IS*, PS*, and PC* caused malfunctions,
3. Indication of a CP, IS, PS, or PC malfunction occurrence to ICC in each CP,
4. Storage of malfunction indications on error flipflops,
5. Storage of the address of the instruction being executed when a maintenance interrupt occurs,
6. Special facilities fo use by recovery programs,
7. Access to standby CP for extraction of diagnostic data through the match facilities,
8. Facility to monitor standby CP executing off line maintenance programs (Parallel MOde), and
9. Facilities for routining the MMC itself.

The Malfunction Monitor Circuit 26, shown is divided into the following three sub-circuits:

1. MAtch Network (MAN), designated 70,
2. PArity Network (PAN), designated 71, and
3. Malfunction Analysis Circuit (MFAC), designated 72.

The MAtch Network (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

The PArity Network 71 (PAN) contains all the Parity Circuits used in checking the transmission and storage of information in the Instruction Store (IS*) and Process Store (PS*).

The Malfunction Analysis Circuit 72 monitors malfunction detection signals from 1. MAN (inter CP matching),
2. PAN (parity checks),
3. DPC (address echo match), and
4. IOC (all-seems-well signals).

The malfunction detection signals are sampled according to the timing intervals and instructions being executed. When a malfunction is detected an error flipflot associated with the detection circuit is set to be used by maintenance program to isolate the source of the malfunction.

The malfunction analysis circuit classifies the malfunction according to its most likely cause (CP*, IS*, PS*, or PC*) and a corresponding error level (CPEL, ISEL, PSEL, or PUEL) is sent to the Interrupt Control Circuit (ICC) in both CP's.

Timing Monitor Circuit (TMC)

The TMC 27 (FIG. 8) provides three timing malfunction detection circuits:

1. Timing check circuit 73 which checks the timing levels generated by TGC,
2. A Real Time Timer Error FF (RTEIF) 74 which monitors the state of the overflow of the Real Time Timer RTT in DPC, and
3. A Recovery Program Timer (RPT) 75 which monitors recovery program execution.

Most failures of the active Timing Generator Circuit (TGC) do not cause inter-CP mismatches. These failures are detected by the TGC checking circuitry of the active TMC. The output of this Circuit is monitored by the active Recovery Control Circuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a fourteen bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must reinitialize RTT often enough to prevent the overflow from occurring. The active RCC monitors the RTT overflow. If the overflow occurs, RTEIF is set and the RCC initiates the system recovery operation.

RPT checks the execution of the Recovery programs. RPT is a seven bit counter which, when enabled, is incremented by one every CP cycle. RPT is enabled whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR exactly every 128th cycle. The recovery program may change the checking mode to permit check-in before the 128th cycle. In the second mode, checkins may not be more than 128 CP cycles apart. The recovery program changes the checking mode or disables the RPT through MAC and must do it at exactly the 128th cycle.

Interrupt Control Circuit (ICC)

The ICC 28 (FIG. 9) controls the execution of maintenance interrupts. A maintenance interrupt is a one-cycle wired transfer instruction which causes the CMC to begin execution of a recovery program. The malfunction detection circuits in the CP initiate maintenance interrupt whose execution takes precedence over the execution of any other CP instructions.

The ICC provides five maintenance interrupts:

1. System Recovery.
2. CP recovery,
3. IS recovery,
4. PS recovery, and
5. PU recovery.

When an interrupt occurs, the ICC products an ICC interrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.U0 as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrupts may occur as a part of the recovery process.

To handle simultaneous interrupts and interrupts during execution of a recovery program, the ICC produces maintenance interrupts according to a priority structure. The system recovery interrupt has highest priority and cannot be inhibited. The CP, IS, PS, and PU interrupts follow respectively in descending order of priority. A CP, IS, PS, or PU interrupt can occur if the interrupt itself or a higher priority interrupt has not already occurred. CP, IS, PS, and PU interrupts may be individually inhibited by the maintenance programs.

Recovery Control Circuit (RCC)

The RCC 29 (shown in duplicate copy in FIG. 10) monitors the malfunction detection circuits which cause system recovery program interrupts. The detection inputs to the RCC (RCC triggers) are produced by the timing generation check circuit in the TMC, error level from the DPC, the Recovery Program Timer in the TMC, a HELP instruction executed by the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive trigger causes the RCC to force one of the four combinations of CP*, and IS*.U0 configurations CP0-IS0.U0, CP1-IS0.U0, CP1-ISI.U0, and CP0-ISI.U0). When an operating CP*-IS*.U0 configuration is selected, the system recovery program completes the recovery and reconfiguration process without further intervention by the RCC.

Configuration Control Circuit (CCC)

Figure 11:
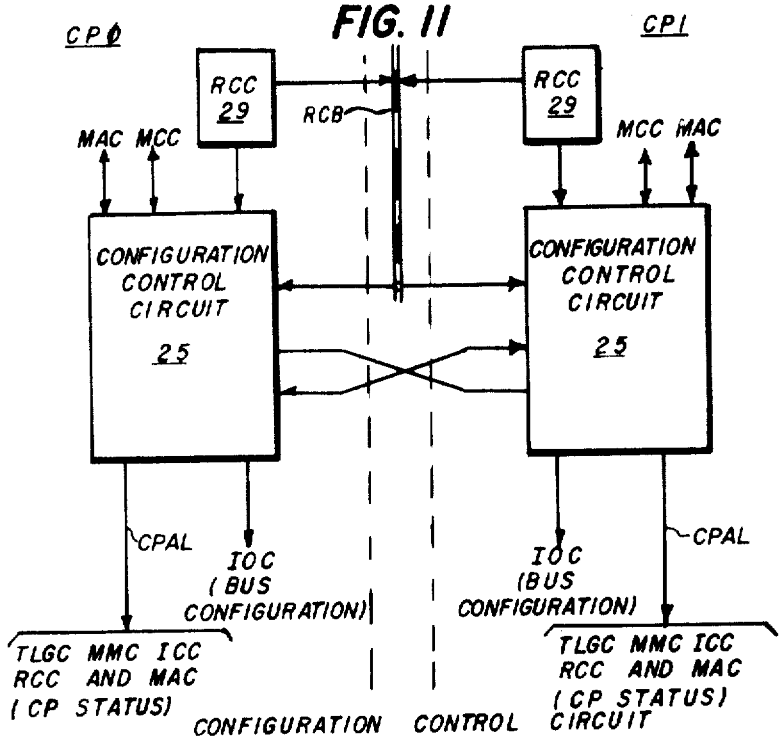
FIG. 11 is a functional block diagram of the Configuration Control Circuit of the Central Processor.

The CCC 25 (FIG. 11) defines the system configuration by controlling:

1. CP* status, and
2. The CP*-IS&, CP*-PS*, and CP*-PC* configurations.

The CP status is specified by:

1. The active CP indication,
2. The standby CP trouble status, and
3. The CP-CP error signal status (separated CPs or coupled CPs).

Each of the IS*, PS*, and PU*, has a bus system (address bus, data bus—the PS and IS share a data bus, and return bus). Each copy within IS*, PS*, and PU* is permanently associated with an individual bus copy. The CCC defines the CP*-IS*, CP*-PS*, and CP*-PC* configurations by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
2. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

Maintenance Access Circuit (MAC)

Figure 12:
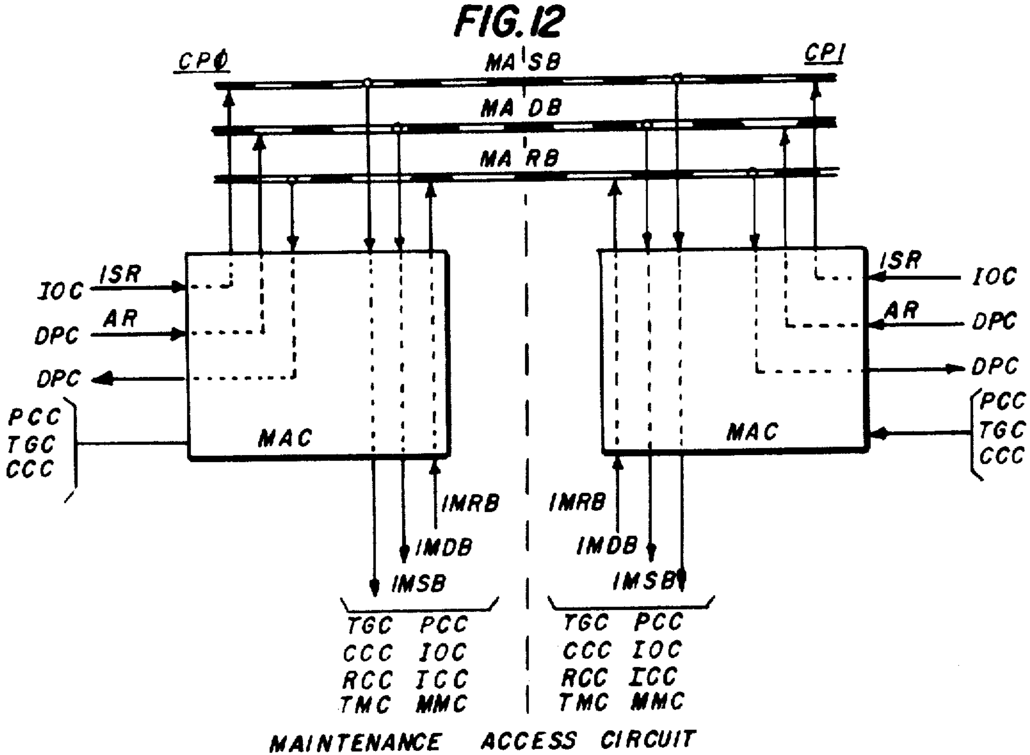
FIG. 12 is a functional block diagram of the Malfunction Monitor Circuit of the Central Processor.

The MAC 30 (FIG. 12) provides maintenance program access to the CP circuits. Read Maintenance Sense Group (RMSG) is an instruction which allows a group of 32 sense points from either the active or the standby CP to be read into a general register (GR1-

Figure 5:
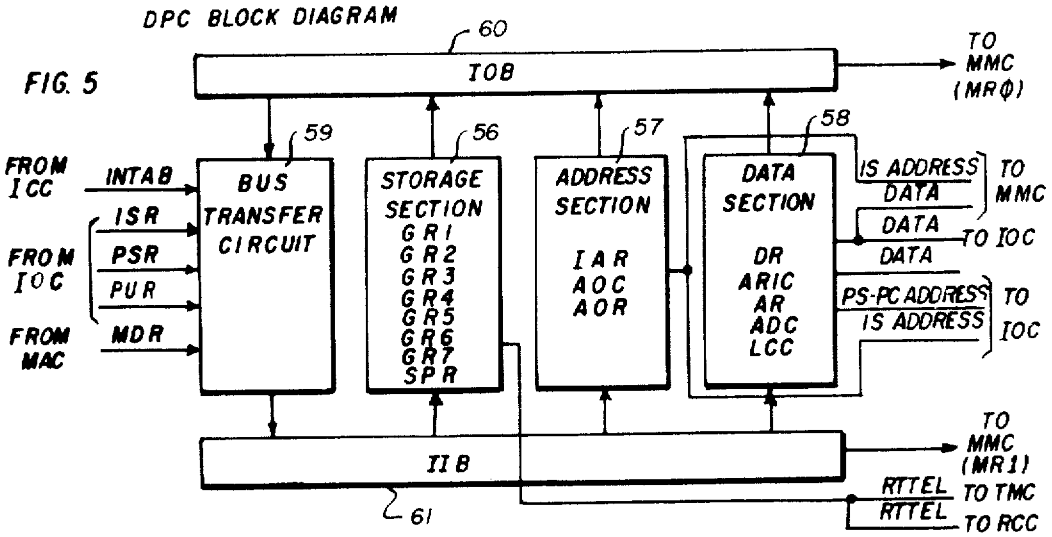
FIG. 5 is a functional block diagram of the Data Processing Circuit of the Central Processor.

GR2 of the Data Processor Circuit 23, see FIG. 5). Write Maintenance Control Group (WMCG) and Write Maintenance Control Point (WMCP) are instructions which respectively allow the program to write a group of 32 maintenance control points or a single control point in either the active CP, the standby CP, or both CPs. In this context, "writing" means that each maintenance control point sets or resets one or more flip-flops.

Although the instructions are decoded and controlled by the PCC, as explained more fully in the above-identified Brenski, et al., application Ser. No. 289,718, MAC selects the control groups, transmits write data from the DPC to the maintenance control groups selected, and reads maintenance sense groups returning data to the DPC.

Maintenance sense and control groups in either the active or standby CP are always selected by the MAC in the active CP only. Write data for maintenance control groups is also always taken only from the MAC in the active CP. In other words, only the MAC in the active CP can execute MAC instructions.

Power Monitor Circuit (PMC)

A Power Monitor and Control Circuit (PMC) (not shown) controls the actions necessary to turn power on or off from a CP or controls the actions necessary to remove power from a CP in which there is a defective power supply.

In case of trouble in a power supply of a CP copy, the PMC will remove all remaining power supplies from that copy.

When power is turned back onto the CP, the PMC will guarantee that the power can be turned on only to the standby CP while keeping the other CP active.

III. INTERRUPT CONTROL CIRCUIT

When a fault occurs in either the Central Processor 17, Instruction Store 19, Process Store 18 or Peripheral Units 15, a fault recovery program must be called and executed. These recovery programs have a higher priority than the call processing (or diagnostic) programs. Further, the execution of certain recovery programs must have precedence over other recovery programs. The ICC determines the program having precedence and makes a hardware transfer to the required Recovery Program.

Programs are assigned to one of the following six priorities (1 = highest, 6 = lowest).

| Priority | Program |
|---|---|
| 1 | System Recovery |
| 2 | Central Processor Recovery |
| 3 | Instruction Store Recovery |
| 4 | Process Store Recovery |
| 5 | Peripheral Unit Recovery |
| 6 | Call Processing and Diagnostics |

Programs at levels 2–6 can be interrupted (i.e., control can be transferred to the starting location of a higher priority program) in response to predetermined error levels (signals detecting hardware malfunctions).

Figure 13:
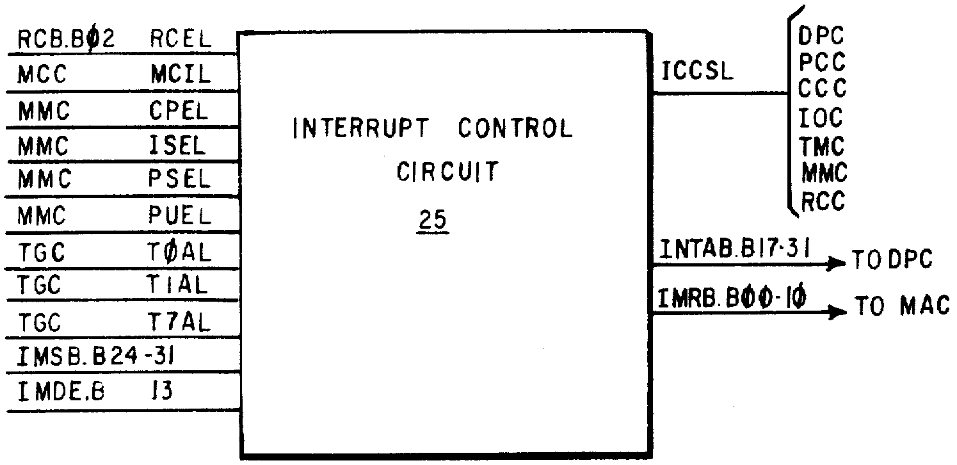
FIG. 13 is a functional block diagram showing the inputs and outputs of the Interrupt Control Circuit.

The following error levels are present (see FIG. 13):

| | |
|---|---|
| PUEL | PU error level; can cause interrupt to PU Recovery Program. |
| PSEL | PS error level; can cause interrupt to PS Recovery Program. |
| ISEL | IS error level; can cause interrupt to IS Recovery Program. |
| CPEL | CP error level; can cause interrupt to CP Recovery Program. |
| RCEL | RCC error level; always causes interrupt to System Recovery Program. |
| MCIL | Manual Interrupt; always causes interrupt to System Recovery Program. |
| SBFFS | Synch. Buffer Flip-Flop Set; always causes an interrupt to System Recovery Program when this MAC point is true. |

An "error level of priority $x$" means the error level that can cause transfer to the recovery program of priority x.

The Interrupt Control Circuit (ICC) 28 checks levels once each machine cycle. When an error level comes "true" the following things can happen.

a. It is ignored by ICC (ICC can be set up to ignore PUEL and/or PSEL . . . and/or CPEL).

b. It is recognized. This means that ICC stores an indication that a particular error level did come true. When a level is recognized the ICC may or may not cause an interrupt cycle (during which CP transfers to starting address of the appropriate recovery program).

Error levels RCEL, MCIL and SBFFS are always recognized and always cause an interrupt cycle (transfer to the start of System Recovery Program). RCEL is generated by the Recovery Control Circuit 29, as disclosed in the above-identified application of Wilber, et al., Ser. No. 341,428. MCIL is a manuallygenerated interrupt level. SBFFS (Synchronous Buffer Flip-Flop Set Level) is program-generated, and it is received from MAC 30 of FIGS. 1 and 12. This means that the System Recovery can itself be interrupted by new occurrences of RCEL, MCIL or SBFFS. Other error levels, when recognized, cause an interrupt cycle only when the sensed error level has higher priority than the current program.

Interrupt Cycle

An interrupt cycle is initiated when an error signal has been recognized and is of higher priority than the current program. The following actions are taken:

a. Generate the Interrupt Control Circuit Sequence Level (ICCSL) which
   forces Bit 15 of the Instruction Address Register (IAR.B15) to zero;
   initializes the Recovery Program Timer (RPT) 75 of the Timing Monitor Circuit 27;
   inhibits the acceptance of the Add One Circuit into the AOR in the Address Section 57 of the Data Processor Circuit 23;
   gates the starting address to the IAR, also in the address Section 57 of the DPC;
   stores failing address contained in AOR to Match Register 0 (MR0) in the Malfunction Monitor Circuit 26;
   sets the CP Separate F/F in the CCC 25;
   terminates matching by the Malfunction Monitor Circuit and stops Standby CP;
   reset IS0IF and IS1IF and set RIHF; and
   initiates RCC cycle if RCC 29 is not active and if RCC is in state S0.

Figure 14:
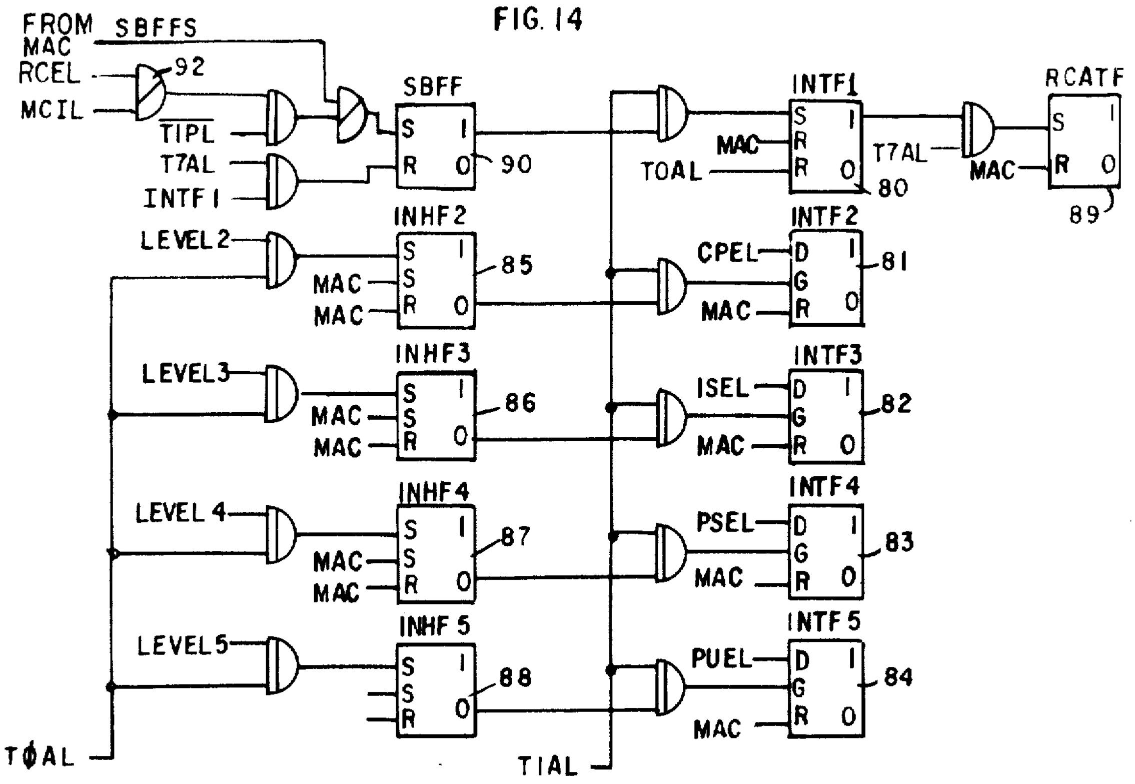
FIG. 14 is a logic block diagram showing the interrupt and inhibit flip-flop section of the ICC.

The interrupt cycle is dependent on the status of various flip-flops having four different functions: Interrupt Flip-Flops — INTF (denoted 80-84 in FIG. 14), Inhibit Flip-Flops — INHF (85-88), the Recovery Control Circuit Active Interrupt Flip-Flop RACIF 89, and the Synch. Buffer Flip-flop SBFF 90.

The interrupt cycle is started when an INTF is set by an error signal, as disclosed presently, and is of higher priority than the current program. The ICCSL is generated by the hardware of the ICC; it must remain true until the actions described have been completed. An interrupt cycle will be initiated even if the instruction being executed is a dual cycle instruction as long as the INTF recognized is of a higher priority than the current program. The interrupt cycle is terminated when the corresponding INHF (or in the case of RCEL, MCIL or SBFFS error levels, the RCAIF) has been set and the necessary recovery program has been entered.

Starting Address Location

Figure 15:
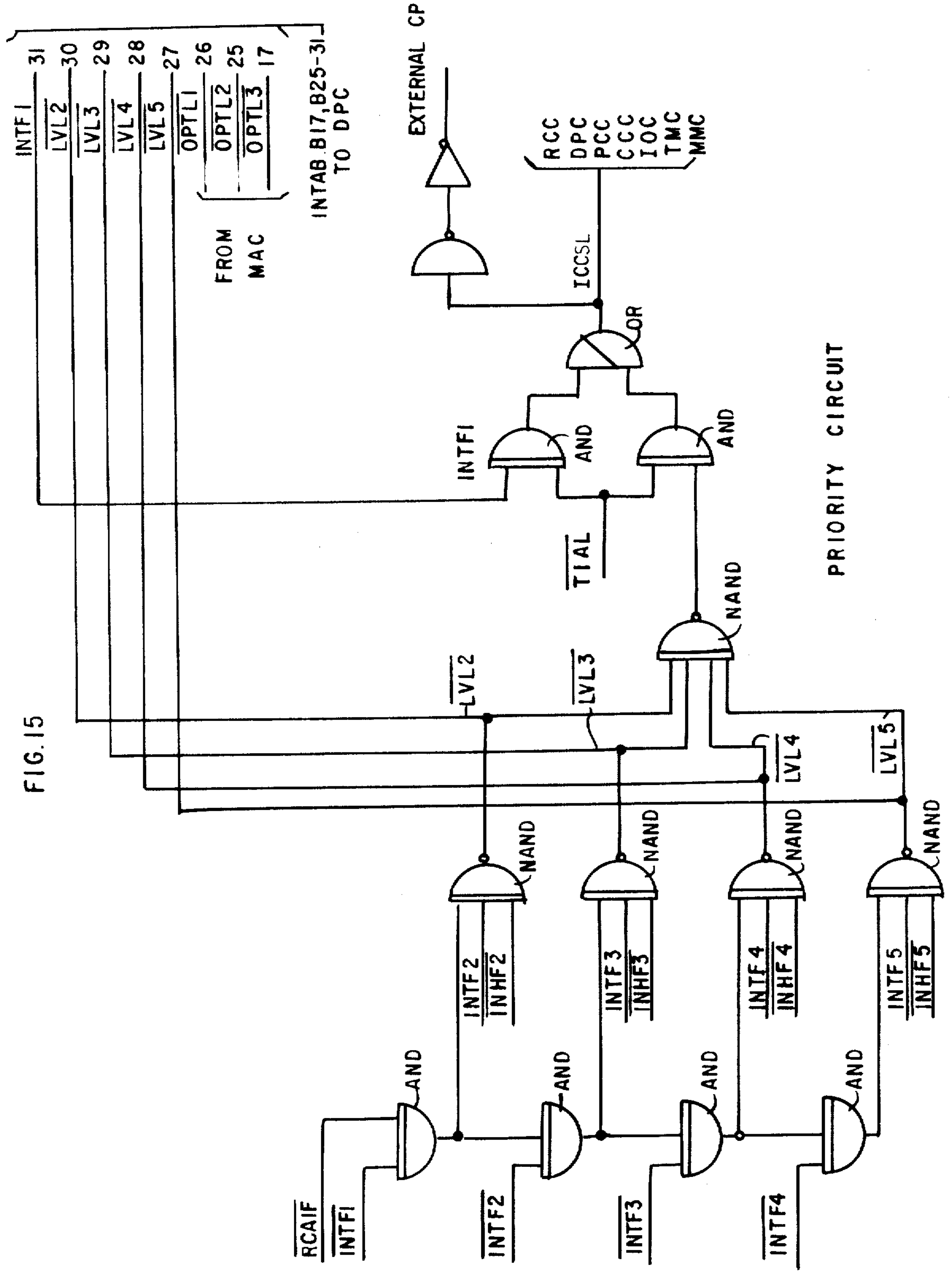
FIG. 15 is a logic block diagram showing the priority circuit and INTAB bus of the ICC.

During an interrupt cycle (ICCSL true), data is sent to the Bus Transfer Control Circuits 55 of the Data Processor Circuit 23 (FIG. 4) via the Interrupt Address Bus (INTAB) which is a direct-wired bus as defined in FIG. 15. At the DPC, a complement Bus transfer takes place, the the resulting address corresponds to that given in the right-hand column of the following table. That is, the starting address of the interrupting program appears at the output of the DPC 23 as follows:

| | |
|---|---|
| Start of priority level 1 program: | 0 |
| Start of priority level 2 program: | 3 |
| Start of priority level 3 program: | 5 |
| Start of priority level 4 program: | 9 |
| Start of priority level 5 program: | 17 |

The Instruction Store locations defined by the right-hand column above contain transfer-page instructions (TRA). Instruction Store locations 1, 2, 4, 6, 7, 8, 10–16, 18–31 contain HELP instructions. If the above TRA instructions fail to execute, these latter locations will trigger the Recovery Control Circuit RCC 29.

Storage of Failing Address

The address in the ADD One Register (AOR) of the DPC 23 will be stored in Match Register MR0 of the MMC 26 during the interrupt cycle. This address should be stored in the Process Store at the earliest opportunity. This allows higher priority interrupts to store new interrupted addresses without the loss of the previous address.

The contents of MR0 are stored in the PS* by a sequence of two instructions. First, the RMSG instruction is executed to read the contents of MR0 into a General Register GRX in DPC. Second, a WPS instruction is used to write the contents of GRX into the PS location.

From the address that is stored in MR0, the program can determine the failing address (i.e., address of the instruction which was being executed when the fault occurred) by subtracting one in the case of CP, IS or PS interrupts. For a PU interrupt, subtract two if the interrupt is caused by a data mismatch or PU Data All Seems Well Error; otherwise subtract one.

Priority 1 Interrupt

The ICC 28 always recognizes error signals RCEL, MCIL or SBFFS or priority 1. The ICC contains three flip-flops INTF1 80, SBFF 90, and RCAIF 89 (FIG. 14) that are associated with this priority. When either one of the error signals fed to OR gate 92 comes true, the SBFF 90 is set. The true output of SBFF is fed via AND gate 93 to INTF1 80 which will be set in T1AL if SBFF were true. When INTF1 becomes true the ICC is alerted that an RCC interrupt has been recognized.

Figure 17:
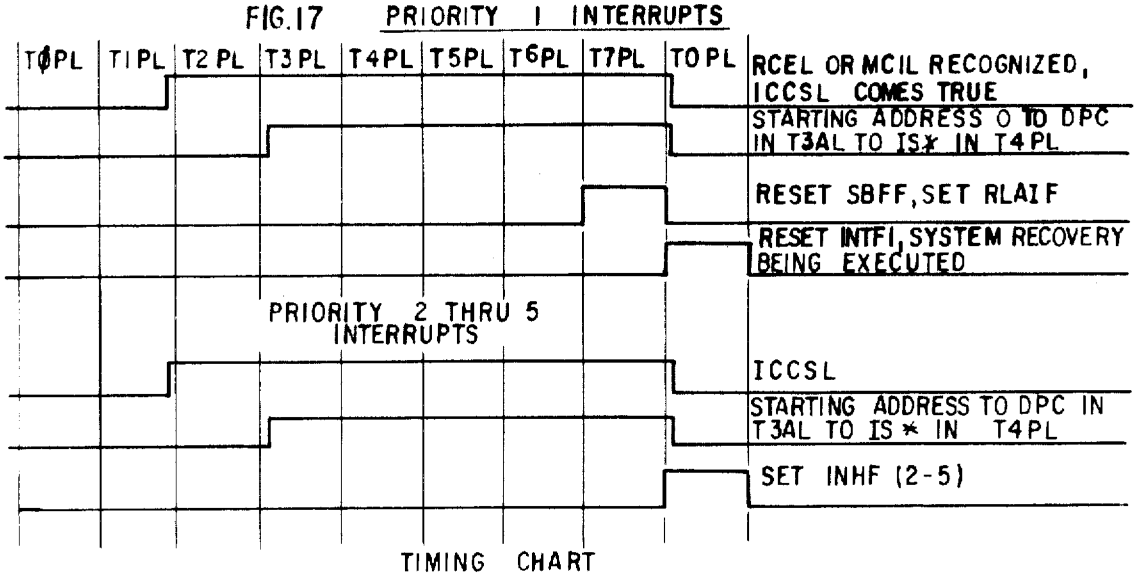
FIG. 17 is a timing chart illustrating the operation of the ICC interrupts during different priorities.

From the priority circuit of FIG. 15 and the Timing diagram of FIG. 17, it can be seen that once INTF1 has been set, ICCSL will start in the last 100 ns of T1PL. ICCSL inhibits the Add One Register (AOR) from accepting IAR = 1 thereby storing the failing address incremented by the constant "one" (the normal AOR acceptance is in T2AL).

ICCSL causes the PCC 20 (see FIG. 4) to gate address zero on INTAB (the Interrupt Address Bus) to the DPC internal bus system and loads the address into the Instruction Address Register IAR in T3AL. The starting address is sent to the IS* in T4PL. In addition, ICCSL causes the RCC to advance from S0 to state S1, and to enable the cycle timer if the interrupt was caused by MCIL. The CCC will set the Separate Flip-Flop CPSPF in the CCC25, the MMC will cease matching and store the failing address in MR0 in T6AL of the interrupt cycle. In addition, the MMC sends a signal to the TGC to stop the standby CP.

ICCSL causes the IOC to IOC to reset the IS0IF and IS1IF to insure that the recovery programs will have complete access to both IS*.AB. RIHF of the IOC is set by ICCSL to inhibit PS operations beyond decimal address 127 and to inhibit all PC*AB usage. ICCSL forces IAR.B15 to zero in the DPC.

In T7AL of the interrupt cycle RCAIF 89 will be set, SBFF 90 reset and ICCSL goes down (i.e., become "false") at the beginning of T0AL in the next cycle. In T0AL of the next machine cycle INTF1 80 will be reset and the System Recovery Program is initiated. All lower priority interrupts will be inhibited but further RCEL, MCIF or SBFFS error levels will be recognized.

States of INTF1 and RCAIF

Figure 16:
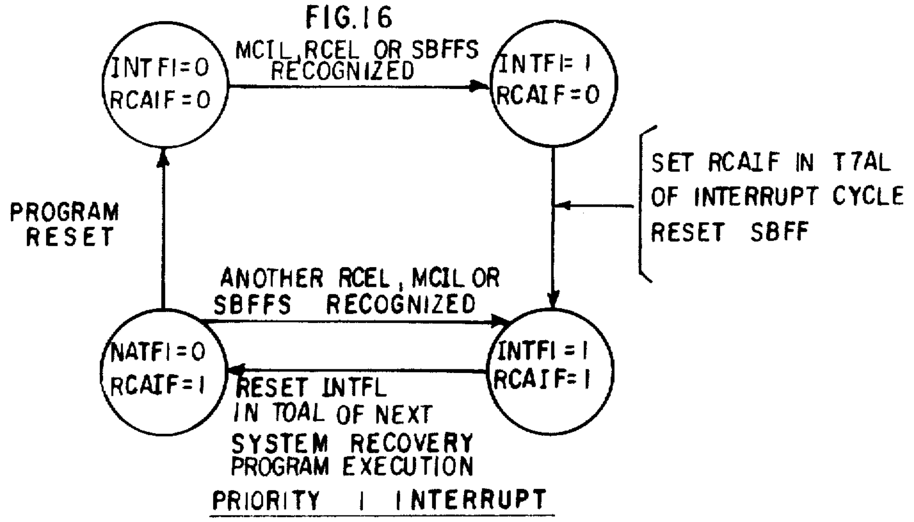
FIG. 16 is a state diagram of the ICC showing a priority one interrupt.

For the RCC System Recovery Program, see FIG. 16.

| INTF1 | RCAIF | |
|---|---|---|
| 0 | 0 | Ready to accept RCEL or MCIL. |
| 1 | 0 | RCC interrupt has been recognized. |
| 0 | 1 | RCC System Recovery Program is being executed. ICC ready to accept another RCEL, MCIL or SBFFS. |
| 1 | 1 | RCC System Recovery Program recognized and interrupt cycle is re-initiated. |

Interrupts of Priority 2 through 5

Error levels of priority 2 through 5 are recognized as a function of the INTF's (81-84) and INHF's (85-86) of priorities 2 through 5 respectively. From FIG. 14, it can be seen that the INTF's can recognize error levels in T1AL only if the corresponding INHF is reset. The priority circuit of FIG. 15 will then determine which priority to recognize.

If an INTF goes true and the INHF is reset the ICC will start the ICCSL providing it is of a higher priority than the current program and any other recognized error levels. The ICCSL causes RCC to advance to state 1 if it was in state 0 and it performs the same actions as given above with the exception that the address stored in MR0 can be either failing address + two (for a PUASW or data mismatch PUME2F) or failing address plus one.

The INTF's 2 through 5 must be D type flip-flops to guarantee that all error levels will be stable in the first 100 ns of T1PL.

States of INTF and INHF

A pair of INTF and INHF flip-flops associated with a given priority of interrupt can be in one of four states for priorities 2 through 5.

| INTF | INHF | |
|---|---|---|
| 0 | 0 | Ready to recognize error signals. |
| 0 | 1 | Inhibit recognition of errors at this priority level. |
| 1 | 0 | Interrupt has been recognized, recovery program has not started. |
| 1 | 1 | Initiated transfer to recovery program (may no longer be there due to higher priority recovery program). |

Program Sensing and Control of ICC Flip-Flops

Figure 18:
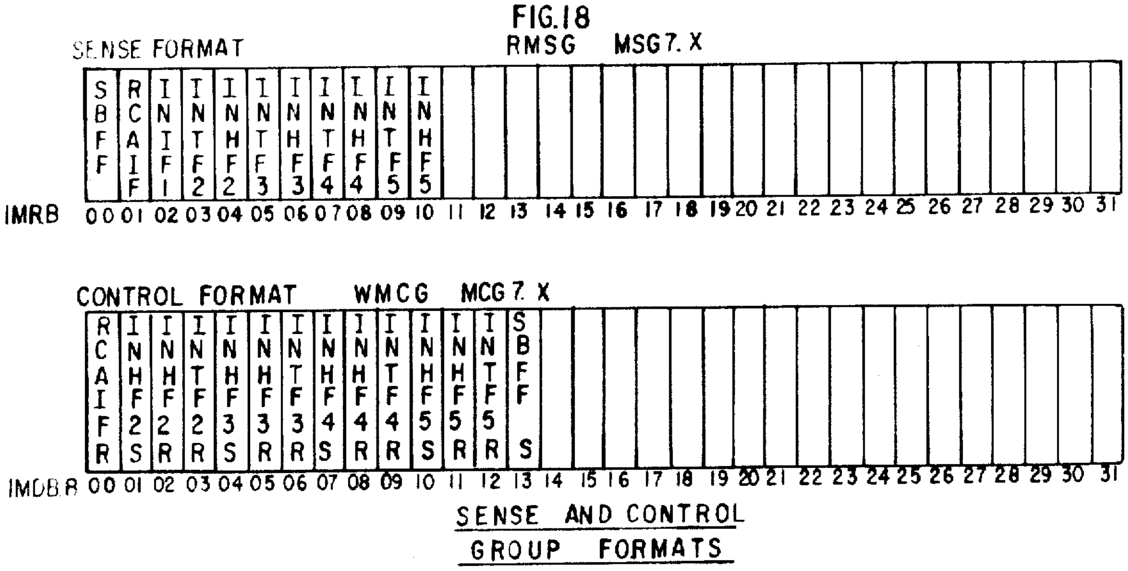
FIG. 18 illustrates the sense and control group formats for the ICC.

The ICC flip-flops may be sensed under program control via a RMSG instruction. FIG. 18 indicates the bit assignment for status indication of each of the 10 ICC flip-flops. Only the TRUE output is sensed.

Program control of the states of the ICC flip-flops is via a WMCG instruction. FIG. 18 also defines the control bit assignment for each flip-flop. Note that all INHF flip-flops can be set or reset by the program while the INTF flip-flops (except INTF1) can only be reset by program control.

To clear the interrupt, the program first resets all the error level indicators in the MMC. After this the Interrupt and the Inhibit flip-flops can be reset with a single WMCG instruction. However, it should be done with two instructions, first the INTF's must be reset and then the INHF's must be reset. If this is not done, an unwanted interrupt may occur.

To disarm an interrupt level, only the Inhibit flip-flop shall be set via a WMCP instruction.

General CP* — ICC Communication Links

Referring again to FIG. 13, inputs to the ICC are routed over private dc and ac busses. The error signals come from RCC and MMC and timing signals from TGC.

Three dc buses are provided from the Maintenance Access Circuit (MAC).

a. Internal Maintenance Select Bus (IMSB)
selects groups of ICC points for status read-out (RMSG instruction), or status control (WMCG or WMCP instruction).

b. Internal Maintenance Data Bus (IMDB)
this data bus provides the control bits supplied during the execution of a WMCG or WMCP instruction to set or reset flip-flops in the ICC.

c. Internal Maintenance Return Bus (IMRB)
the sense points selected are gated onto the bus during the execution of an RMSG instruction. One bus is provided from the ICC to the DPC.

One ac bus is provided for communication between the RCC and the ICC.

a. Recovery Control Bus (RCB.B02)
the RCEL signal is sent to the ICC via this bus.

An ac coupled signal Manual Control Circuit Interrupt Level (MCIL) is sent from the MCC to the ICC of both CP copies to permit a Maintenance Man to initiate an interrupt cycle.

Maintenance Considerations

Maintenance and diagnosis of the Interrupt Control Circuits can only be performed on the standby unit.

To prevent any interrupts occurring in the active unit the level being routined in the standby shall be disarmed in the active unit.

The Instruction Store Bus configuration should be such that the standby CP receives all instructions from the standby Instruction Store and the active CP receives all instructions from the active IS.

A dynamic test of the standby ICC may be performed by placing the standby CP in the sample match mode and allow it to run for *n* cycles; cause a mismatch to occur; and when the standby CP stops, observe if the standby unit has transferred to the proper recovery program. Status sensing is provided via an RMSG instruction as described above.

Inputs to ICC

The inputs listed below will require only one (1) unit load of drive from signal source.

| SIGNAL SOURCE | MNEMONIC | DESCRIPTION AND USAGE |
|---|---|---|
| RCB.02 | RCEL | Recovery Control Error Level — An asynchronous signal causing Level 1 interrupt. This signal is 1.0 μsec. minimum. |
| MMC | CPEL | Central Processor Error Level — Indicates a mismatch (except those that are accompanied by error indicators of PS, PU or IS) has been detected; may cause a priority 2 interrupt. |
| MMC | ISEL | Instruction Store Error Level — Indicates an IS address parity error, IS data parity error, IS write address error, or All Seems Well error has been detected; may cause a priority 3 interrupt. |
| MMC | PSEL | Process Store Error Level — Indicates a PS data parity error, PS write address error, or All Seems Well error has been detected; may cause a priority 4 interrupt. |
| MMC | PUEL | Peripheral Unit Error Level — Indicates an address error or an All Seems Well error; may cause a priority 5 interrupt. |
| TGC | T0AL<br>T1AL<br>T1PL<br>T7AL | Accept levels required for control of ICC circuitry. |
| IMSB | See FIG. 18 | Internal Maintenance Select Bus — This is an eight-bit bus which selects groups of ICC points for status read-out (RMCG instruction) or status control (WMCG instruction). |

–Continued

| SIGNAL SOURCE | MNEMONIC | DESCRIPTION AND USAGE |
|---|---|---|
| IMDB | See FIG. 18 | Internal Maintenance Data Bus — This 32-bit data bus provides the control bits supplied during the execution of a WMCG or WMCP instruction to set or reset flip-flops in the ICC. |
| MCC | MCIL | Manual Control Circuit Interrupt Level — Provides access to ICC from the Manual Control Console (MCC). |
| | OPTL3 | Option 3 Level — When the Interrupt Address Switch of the MCC is in the Call Processing Position a zero is placed in bit 17 of the INTAB to force entry to location 0 of IS*.U1 when an interrupt of priority 1 occurs. |
| | SPOL | Special Program Option Level — When the Interrupt Address Switch is in the Special Program Position a zero is placed in bits 25 and 26 to force entry to location 96 of IS*.U0 when an interrupt of priority 1 occurs. |

Outputs from ICC

The outputs listed below provide drive equivalent to a conventional line driver.

| USER | MNEMONIC | DESCRIPTION AND USAGE |
|---|---|---|
| DPC PCC CCC IOC TMC MMC RCC | ICCSL | Interrupt Control Circuit Sequence Level indicates an interrupt has occurred. |

| USER | ACTION TAKEN |
|---|---|
| DPC | Forces IAR.B15 to zero. |
| PCC | Inhibit Add One Circuit; gate starting address into IAR. |
| CCC | Set Separate F/F. |
| IOC | Indicates a hardware interrupt and is used in conjunction with CPAL to reset IS0IF, IS1IF and to set RIHF. |
| TMC | Initialize RPT. |
| MMC | Store contents of AOR in MR0 during T6AL and terminate matching, and send a signal to the TGC to stop Standby CP. |
| RCC | This level initiates the RCC cycle if RCC is not active and if RCC is in state S0. |

| USER | MNEMONIC | DESCRIPTION AND USAGE |
|---|---|---|
| INTAB | See FIG. 15 | Interrupt Address Bus — Contains starting address of interrupting program during interval ICCSL is true, it is sent to DPC. |
| IMRB | See FIG. 18 | Internal Maintenance Return Bus — Points sensed by MAC are selected by the IMSB.BXX signal and gated onto the bus during the execution of an RMSG Instruction. |

We claim:

1. In a data processing system having first and second central data processors, instruction stores, process stores, and peripheral controllers, each said processors including processing circuits and maintenance circuits and further including general programs, a system recovery program, and a plurality of subsystem recovery programs, said recovery programs being stored in known locations in memory and each including an associated first recovery program instruction storage location, said system being adapted wherein only one of said processors is active at one time and the other is standby, each of said processors being further provided with recovery control circuit means for generating system error level signals, malfunction monitor circuit means for generating subsystem error level signals, each representative of malfunctions in selected subsystems of said system, the improvement comprising:

interrupt control circuit means in each of said central processors responsive to said system error level signals and to said subsystem error level signals and to programmed error level signals for interrupting a program being executed and for switching to a recovery program in predetermined order of priority and including:

a plurality of interrupt bistable circuit means, each actuated by an associated error level signal to generate an error level signal representative of the recovery program associated therewith;

priority circuit means responsive to said error level signals of said interrupt bistable circuit means for generating an interrupt control circuit sequence level to initiate a recovery cycle, and for generating priority level signals representative of the order of priority of each of said error level signals;

a plurality of inhibit circuit means, one associated with each of said interrupt bistable circuit means of priority less than the highest and responsive to said priority level signals for inhibiting actuation of its associated interrupt bistable circuit means when a recovery program is being run of a higher priority;

input/output circuit means interfacing said central processor with said instruction stores, process stores, and peripheral controllers, and including a first instruction store inhibit bistable circuit associated with one of said instruction stores and a second instruction store inhibit bistable circuit associated with said second instruction store:

and further comprising means for communicating said interrupt control circuit sequence level to reset said first and second instruction store inhibit bistable circuits, thereby enabling said system to freely manipulate central processor and instruction store combinations.

2. The system of claim 1 wherein said priority circuit means is responsive to the output signals of said interrupt bistable circuit means and to the output signals of said inhibit circuit means for generating a plurality of address signals representative of the state of said priority circuit means and of the recovery program of highest order being called for by the system; and wherein said system further comprises:

interrupt address bus means for communicating said signals representative of the priority of the recovery program being called for to the processing circuits of said central processor for generating address signals representative of a memory location containing a transfer instruction, said transfer instruction providing access to the first instruction of the desired recovery program.

3. The system of claim 1 wherein each of said subsystem error level signals is representative respectively and in order of priority of a central processor error level signal, an instruction store error level signal, a processor store error level signal, and a peripheral unit error level signal, and wherein the highest priority error level signal is a system recovery error level signal.

4. The system of claim 3 further comprising circuit means responsive to said recovery control error level signal and to a manually generated error level signal and to a program controlled error level signal for actuating said first order priority interrupt bistable circuit means irrespective of the data processing or recovery program being run at the time.

5. The system of claim 1 further comprising malfunction monitor circuit means including match register circuit means; and circuit means for storing the failing address responsive to said interrupt control circuit sequence level signal in said match registers of said malfunction monitor circuit means.

6. The system of claim 5 further comprising recovery program timer means reset by said interrupt control circuit sequence level signal for timing the execution of said recovery programs.

7. The system of claim 1 further comprising maintenance access circuit means responsive to program control signals for selectively controlling the states of said inhibit circuit means, whereby said interrupt bistable circuit means may be controlled independently of said inhibit circuit means for diagnostic testing.

8. The system of claim 7 wherein said maintenance access circuit means further includes means for selectively resetting the states of said interrupt bistable circuit means under program control.

* * * * *